US009290204B2

(12) United States Patent
Lavoie (10) Patent No.: US 9,290,204 B2
(45) Date of Patent: Mar. 22, 2016

(54) HITCH ANGLE MONITORING SYSTEM AND METHOD

(71) Applicant: Ford Global Technologies, LLC, Dearborn, MI (US)

(72) Inventor: Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 154 days.

(21) Appl. No.: 14/313,218

(22) Filed: Jun. 24, 2014

(65) Prior Publication Data

US 2014/0324295 A1 Oct. 30, 2014

Related U.S. Application Data

(63) Continuation-in-part of application No. 14/301,919, filed on Jun. 11, 2014, which is a continuation-in-part of application No. 14/294,489, filed on Jun. 3, 2014, which is a continuation-in-part of application No.

(Continued)

(51) Int. Cl.
*B62D 13/06* (2006.01)
*B60R 1/00* (2006.01)
*B60W 30/00* (2006.01)
*H04N 7/18* (2006.01)

(52) U.S. Cl.
CPC ............... *B62D 13/06* (2013.01); *B60R 1/003* (2013.01); *B60W 30/00* (2013.01); *H04N 7/183* (2013.01); *B60R 2300/806* (2013.01)

(58) Field of Classification Search
CPC .. B62D 13/06; B60R 1/003; B60R 2300/806; H04N 7/183
USPC ............................................................ 701/41
See application file for complete search history.

(56) References Cited

U.S. PATENT DOCUMENTS

| 3,605,088 A | 9/1971 | Savelli |
| 3,833,928 A | 9/1974 | Gavit et al. |
| 3,924,257 A | 12/1975 | Roberts |
| 4,044,706 A | 8/1977 | Gill |
| 4,430,637 A | 2/1984 | Koch-Ducker et al. |

(Continued)

FOREIGN PATENT DOCUMENTS

| CN | 101610420 A | 12/2009 |
| CN | 101833869 A | 9/2010 |

(Continued)

OTHER PUBLICATIONS

Nüsser, René; Pelz, Rodolfo Mann, "Bluetooth-based Wireless Connectivity in an Automotive Environment", VTC, 2000, pp. 1935-1942.

(Continued)

*Primary Examiner* — Richard Camby
(74) *Attorney, Agent, or Firm* — Raymond Coppiellie; Price Heneveld LLP (57) ABSTRACT

A hitch angle monitoring system and method are provided. A display shows an imaged scene of a hitch connection between a tow vehicle and a trailer. A processor is configured to superimpose an overlay on the imaged scene, wherein the overlay indicates a hitch angle position limit. A hitch angle position indicator is shown on the display and visually relates a current hitch angle position to the hitch angle position limit.

20 Claims, 4 Drawing Sheets

Related U.S. Application Data

14/289,888, filed on May 29, 2014, which is a continuation-in-part of application No. 14/256,427, filed on Apr. 18, 2014, said application No. 14/294,489 is a continuation-in-part of application No. 14/257,420, filed on Apr. 21, 2014, which is a continuation-in-part of application No. 14/256,427, filed on Apr. 18, 2014, which is a continuation-in-part of application No. 14/249,781, filed on Apr. 10, 2014, which is a continuation-in-part of application No. 14/188,213, filed on Feb. 24, 2014, which is a continuation-in-part of application No. 13/847,508, filed on Mar. 20, 2013, and a continuation-in-part of application No. 14/068,387, filed on Oct. 31, 2013, now Pat. No. 9,102,271, which is a continuation-in-part of application No. 14/059,835, filed on Oct. 22, 2013, which is a continuation-in-part of application No. 13/443,743, filed on Apr. 10, 2012, now Pat. No. 8,825,328, which is a continuation-in-part of application No. 13/336,060, filed on Dec. 23, 2011, now Pat. No. 8,909,426, said application No. 14/249,781 is a continuation-in-part of application No. 14/161,832, filed on Jan. 23, 2014, which is a continuation-in-part of application No. 14/059,835, filed on Oct. 22, 2013, said application No. 14/249,781 is a continuation-in-part of application No. 14/201,130, filed on Mar. 7, 2014, which is a continuation-in-part of application No. 14/068,387, filed on Oct. 31, 2013, now Pat. No. 9,102,271.

(60) Provisional application No. 61/477,132, filed on Apr. 19, 2011.

(56) References Cited

U.S. PATENT DOCUMENTS

| | | | |
|---|---|---|---|
| 4,846,094 A | 7/1989 | Woods |
| 4,848,499 A | 7/1989 | Martinet et al. |
| 4,897,642 A | 1/1990 | DiLullo et al. |
| 4,947,097 A | 8/1990 | Tao |
| 5,097,250 A | 3/1992 | Hernandez |
| 5,132,851 A | 7/1992 | Bomar et al. |
| 5,191,328 A | 3/1993 | Nelson |
| 5,235,316 A | 8/1993 | Qualizza |
| 5,247,442 A | 9/1993 | Kendall |
| 5,455,557 A | 10/1995 | Noll et al. |
| 5,461,357 A | 10/1995 | Yoshioka et al. |
| 5,650,764 A | 7/1997 | McCullough |
| 5,690,347 A | 11/1997 | Juergens et al. |
| 5,734,336 A | 3/1998 | Smithline |
| 5,781,662 A | 7/1998 | Mori et al. |
| 5,905,433 A | 5/1999 | Wortham |
| 5,951,035 A | 9/1999 | Phillips, Jr. et al. |
| 5,957,232 A | 9/1999 | Shimizu et al. |
| 5,999,091 A | 12/1999 | Wortham |
| 6,100,795 A | 8/2000 | Otterbacher et al. |
| 6,178,650 B1 | 1/2001 | Thibodeaux |
| 6,182,010 B1 | 1/2001 | Berstis |
| 6,198,992 B1 | 3/2001 | Winslow |
| 6,226,226 B1 | 5/2001 | Lill et al. |
| 6,366,202 B1 | 4/2002 | Rosenthal |
| 6,411,898 B2 | 6/2002 | Ishida et al. |
| 6,434,486 B1 | 8/2002 | Studt et al. |
| 6,480,104 B1 | 11/2002 | Wall et al. |
| 6,483,429 B1 | 11/2002 | Yasui et al. |
| 6,526,335 B1 | 2/2003 | Treyz et al. |
| 6,573,833 B1 | 6/2003 | Rosenthal |
| 6,577,952 B2 | 6/2003 | Geier et al. |
| 6,580,984 B2 | 6/2003 | Fecher et al. |
| 6,604,592 B2 | 8/2003 | Pietsch et al. |
| 6,643,576 B1 | 11/2003 | O Connor et al. |
| 6,683,539 B2 | 1/2004 | Trajkovic et al. |
| 6,801,125 B1 | 10/2004 | McGregor et al. |
| 6,816,765 B2 | 11/2004 | Yamamoto et al. |
| 6,837,432 B2 | 1/2005 | Tsikos et al. |
| 6,847,916 B1 | 1/2005 | Ying |
| 6,933,837 B2 | 8/2005 | Gunderson et al. |
| 6,959,970 B2 | 11/2005 | Tseng |
| 6,970,184 B2 | 11/2005 | Hirama et al. |
| 6,989,739 B2 | 1/2006 | Li |
| 7,026,957 B2 | 4/2006 | Rubenstein |
| 7,047,117 B2 | 5/2006 | Akiyama et al. |
| 7,085,634 B2 | 8/2006 | Endo et al. |
| 7,089,101 B2 | 8/2006 | Fischer et al. |
| 7,136,754 B2 | 11/2006 | Hahn et al. |
| 7,142,098 B2 | 11/2006 | Lang et al. |
| 7,154,385 B2 | 12/2006 | Lee et al. |
| 7,175,194 B2 | 2/2007 | Ball |
| 7,204,504 B2 | 4/2007 | Gehring et al. |
| 7,207,041 B2 | 4/2007 | Elson et al. |
| 7,220,217 B2 | 5/2007 | Tamai et al. |
| 7,225,891 B2 | 6/2007 | Gehring et al. |
| 7,229,139 B2 | 6/2007 | Lu et al. |
| 7,239,958 B2 | 7/2007 | Grougan et al. |
| 7,266,435 B2 | 9/2007 | Wang et al. |
| 7,309,075 B2 | 12/2007 | Ramsey et al. |
| 7,310,084 B2 | 12/2007 | Shitanaka et al. |
| 7,315,299 B2 | 1/2008 | Sunda et al. |
| 7,319,927 B1 | 1/2008 | Sun et al. |
| 7,353,110 B2 | 4/2008 | Kim |
| 7,366,892 B2 | 4/2008 | Spaur et al. |
| 7,401,871 B2 | 7/2008 | Lu et al. |
| 7,425,889 B2 | 9/2008 | Widmann et al. |
| 7,451,020 B2 | 11/2008 | Goetting et al. |
| 7,463,137 B2 | 12/2008 | Wishart et al. |
| 7,505,784 B2 | 3/2009 | Barbera |
| 7,537,256 B2 | 5/2009 | Gates et al. |
| 7,552,009 B2 | 6/2009 | Nelson |
| 7,602,782 B2 | 10/2009 | Doviak et al. |
| 7,623,952 B2 | 11/2009 | Unruh et al. |
| 7,640,180 B1 | 12/2009 | Shimizu et al. |
| 7,689,253 B2 | 3/2010 | Basir |
| 7,690,737 B2 | 4/2010 | Lu |
| 7,692,557 B2 | 4/2010 | Medina et al. |
| 7,693,661 B2 | 4/2010 | Iwasaka |
| 7,715,953 B2 | 5/2010 | Shepard |
| 7,777,615 B2 | 8/2010 | Okuda et al. |
| 7,783,699 B2 | 8/2010 | Rasin et al. |
| 7,786,849 B2 | 8/2010 | Buckley |
| 7,801,941 B2 | 9/2010 | Conneely et al. |
| 7,825,782 B2 | 11/2010 | Hermann |
| 7,827,047 B2 | 11/2010 | Anderson et al. |
| 7,904,222 B2 | 3/2011 | Lee et al. |
| 7,907,975 B2 | 3/2011 | Sakamoto et al. |
| 7,917,081 B2 | 3/2011 | Voto et al. |
| 7,932,623 B2 | 4/2011 | Burlak et al. |
| 7,932,815 B2 | 4/2011 | Martinez et al. |
| 7,950,751 B2 | 5/2011 | Offerle et al. |
| 7,969,326 B2 | 6/2011 | Sakakibara |
| 8,009,025 B2 | 8/2011 | Engstrom et al. |
| 8,010,252 B2 | 8/2011 | Getman et al. |
| 8,019,592 B2 | 9/2011 | Fukuoka et al. |
| 8,024,743 B2 | 9/2011 | Werner |
| 8,033,955 B2 | 10/2011 | FarNsworth |
| 8,036,792 B2 | 10/2011 | Dechamp |
| 8,037,500 B2 | 10/2011 | Margis et al. |
| 8,038,166 B1 | 10/2011 | Piesinger |
| 8,044,776 B2 | 10/2011 | Schofield et al. |
| 8,044,779 B2 | 10/2011 | Hahn et al. |
| 8,121,802 B2 | 2/2012 | Grider et al. |
| 8,131,458 B1 | 3/2012 | Zilka |
| 8,140,138 B2 | 3/2012 | Chrumka |
| 8,150,474 B2 | 4/2012 | Saito et al. |
| 8,165,770 B2 | 4/2012 | Getman et al. |
| 8,169,341 B2 | 5/2012 | Toledo et al. |
| 8,174,576 B2 | 5/2012 | Akatsuka et al. |
| 8,179,238 B2 | 5/2012 | Roberts, Sr. et al. |
| 8,195,145 B2 | 6/2012 | Angelhag |
| 8,205,704 B2 | 6/2012 | Kadowaki et al. |
| 8,244,442 B2 | 8/2012 | Craig et al. |
| 8,245,270 B2 | 8/2012 | Cooperstein et al. |

(56) References Cited

U.S. PATENT DOCUMENTS

| | | |
|---|---|---|
| 8,255,007 B2 | 8/2012 | Saito et al. |
| 8,267,485 B2 | 9/2012 | Barlsen et al. |
| 8,270,933 B2 | 9/2012 | Riemer et al. |
| 8,280,607 B2 | 10/2012 | Gatti et al. |
| 8,308,182 B2 | 11/2012 | Ortmann et al. |
| 8,310,353 B2 | 11/2012 | Hinninger et al. |
| 8,315,617 B2 | 11/2012 | Tadayon et al. |
| 8,319,663 B2 | 11/2012 | Von Reyher et al. |
| 8,352,575 B2 | 1/2013 | Samaha |
| 8,362,888 B2 | 1/2013 | Roberts, Sr. et al. |
| 8,370,056 B2 | 2/2013 | Trombley et al. |
| 8,374,749 B2 | 2/2013 | Tanaka |
| 8,380,416 B2 | 2/2013 | Offerle et al. |
| 8,392,066 B2 | 3/2013 | Ehara et al. |
| 8,401,744 B2 | 3/2013 | Chiocco |
| 8,406,956 B2 | 3/2013 | Wey et al. |
| 8,417,263 B2 | 4/2013 | Jenkins et al. |
| 8,417,417 B2 | 4/2013 | Chen et al. |
| 8,451,107 B2 | 5/2013 | Lu et al. |
| 8,471,691 B2 | 6/2013 | Zhang et al. |
| 8,473,575 B2 | 6/2013 | Marchwicki et al. |
| 8,494,439 B2 | 7/2013 | Faenger |
| 8,498,757 B2 | 7/2013 | Bowden et al. |
| 8,548,680 B2 | 10/2013 | Ryerson et al. |
| 8,560,175 B2 | 10/2013 | Bammert et al. |
| 8,571,758 B2 | 10/2013 | Klier et al. |
| 8,626,382 B2 | 1/2014 | Obradovich |
| 8,755,984 B2 | 6/2014 | Rupp et al. |
| 8,786,417 B2 | 7/2014 | Holmen et al. |
| 8,807,261 B2 | 8/2014 | Subrt et al. |
| 8,930,140 B2 | 1/2015 | Trombley et al. |
| 9,008,913 B1 | 4/2015 | Sears et al. |
| 9,132,856 B2 * | 9/2015 | Shepard ............... B62D 13/06 |
| 2002/0005780 A1 | 1/2002 | Ehrlich et al. |
| 2002/0098853 A1 | 7/2002 | Chrumka |
| 2003/0079123 A1 | 4/2003 | Mas Ribes |
| 2003/0147534 A1 | 8/2003 | Ablay et al. |
| 2003/0222982 A1 | 12/2003 | Hamdan et al. |
| 2003/0234512 A1 | 12/2003 | Holub |
| 2004/0119822 A1 | 6/2004 | Custer et al. |
| 2004/0203660 A1 | 10/2004 | Tibrewal et al. |
| 2004/0207525 A1 | 10/2004 | Wholey et al. |
| 2004/0260438 A1 | 12/2004 | Chernetsky et al. |
| 2005/0000738 A1 | 1/2005 | Gehring et al. |
| 2005/0073433 A1 | 4/2005 | Gunderson et al. |
| 2005/0074143 A1 | 4/2005 | Kawai |
| 2005/0091408 A1 | 4/2005 | Parupudi et al. |
| 2005/0128059 A1 | 6/2005 | Vause |
| 2005/0146607 A1 | 7/2005 | Linn et al. |
| 2005/0168331 A1 | 8/2005 | Gunderson |
| 2005/0177635 A1 | 8/2005 | Schmidt et al. |
| 2005/0206225 A1 | 9/2005 | Offerle et al. |
| 2005/0206231 A1 | 9/2005 | Lu et al. |
| 2005/0206299 A1 | 9/2005 | Nakamura et al. |
| 2005/0236201 A1 | 10/2005 | Spannheimer et al. |
| 2005/0236896 A1 | 10/2005 | Offerle et al. |
| 2006/0071447 A1 | 4/2006 | Gehring et al. |
| 2006/0076828 A1 | 4/2006 | Lu et al. |
| 2006/0092129 A1 | 5/2006 | Choquet et al. |
| 2006/0103511 A1 | 5/2006 | Lee et al. |
| 2006/0111820 A1 | 5/2006 | Goetting et al. |
| 2006/0142936 A1 | 6/2006 | Dix |
| 2006/0156315 A1 | 7/2006 | Wood et al. |
| 2006/0190097 A1 | 8/2006 | Rubenstein |
| 2006/0250501 A1 | 11/2006 | Widmann et al. |
| 2006/0287821 A1 | 12/2006 | Lin |
| 2006/0293800 A1 | 12/2006 | Bauer et al. |
| 2007/0027581 A1 | 2/2007 | Bauer et al. |
| 2007/0132560 A1 | 6/2007 | Nystrom et al. |
| 2007/0132573 A1 | 6/2007 | Quach et al. |
| 2007/0198190 A1 | 8/2007 | Bauer et al. |
| 2007/0216136 A1 | 9/2007 | Dietz |
| 2008/0148374 A1 | 6/2008 | Spaur et al. |
| 2008/0177443 A1 | 7/2008 | Lee et al. |
| 2008/0180526 A1 | 7/2008 | Trevino |
| 2008/0231701 A1 | 9/2008 | Greenwood et al. |
| 2008/0312792 A1 | 12/2008 | Dechamp |
| 2008/0313050 A1 | 12/2008 | Basir |
| 2009/0005932 A1 | 1/2009 | Lee et al. |
| 2009/0045924 A1 | 2/2009 | Roberts, Sr. et al. |
| 2009/0063053 A1 | 3/2009 | Basson et al. |
| 2009/0075624 A1 | 3/2009 | Cox et al. |
| 2009/0079828 A1 | 3/2009 | Lee et al. |
| 2009/0082935 A1 | 3/2009 | Leschuk et al. |
| 2009/0093928 A1 | 4/2009 | Getman et al. |
| 2009/0106036 A1 | 4/2009 | Tamura et al. |
| 2009/0117890 A1 | 5/2009 | Jacobsen et al. |
| 2009/0140064 A1 | 6/2009 | Schultz et al. |
| 2009/0253466 A1 | 10/2009 | Saito et al. |
| 2009/0271078 A1 | 10/2009 | Dickinson |
| 2009/0306854 A1 | 12/2009 | Dechamp |
| 2009/0318119 A1 | 12/2009 | Basir et al. |
| 2010/0060739 A1 | 3/2010 | Salazar |
| 2010/0063670 A1 | 3/2010 | Brzezinski et al. |
| 2010/0098853 A1 | 4/2010 | Hoffmann et al. |
| 2010/0152989 A1 | 6/2010 | Smith et al. |
| 2010/0156671 A1 | 6/2010 | Lee et al. |
| 2010/0157061 A1 | 6/2010 | Katsman et al. |
| 2010/0171828 A1 | 7/2010 | Ishii |
| 2010/0191421 A1 | 7/2010 | Nilsson |
| 2010/0198491 A1 | 8/2010 | Mays |
| 2010/0222964 A1 | 9/2010 | Dechamp |
| 2010/0234071 A1 | 9/2010 | Shabtay et al. |
| 2010/0305815 A1 | 12/2010 | Trueman et al. |
| 2010/0306309 A1 | 12/2010 | Santori et al. |
| 2010/0324770 A1 | 12/2010 | Ramsey et al. |
| 2011/0022282 A1 | 1/2011 | Wu et al. |
| 2011/0025482 A1 | 2/2011 | Alguera et al. |
| 2011/0063425 A1 | 3/2011 | Tieman |
| 2011/0088659 A1 | 4/2011 | Wang et al. |
| 2011/0110530 A1 | 5/2011 | Kimura |
| 2011/0112762 A1 | 5/2011 | Gruijters et al. |
| 2011/0125457 A1 | 5/2011 | Lee et al. |
| 2011/0129093 A1 | 6/2011 | Karam et al. |
| 2011/0140872 A1 | 6/2011 | McClure |
| 2011/0149077 A1 | 6/2011 | Robert |
| 2011/0153198 A1 | 6/2011 | Kokkas et al. |
| 2011/0181457 A1 | 7/2011 | Basten |
| 2011/0185390 A1 | 7/2011 | Faenger et al. |
| 2011/0195659 A1 | 8/2011 | Boll et al. |
| 2011/0216199 A1 | 9/2011 | Trevino et al. |
| 2011/0257860 A1 | 10/2011 | Getman et al. |
| 2011/0281522 A1 | 11/2011 | Suda |
| 2011/0296037 A1 | 12/2011 | Westra et al. |
| 2012/0004805 A1 | 1/2012 | Gray et al. |
| 2012/0062743 A1 | 3/2012 | Lynam et al. |
| 2012/0062744 A1 | 3/2012 | Schofield et al. |
| 2012/0065815 A1 | 3/2012 | Hess |
| 2012/0079002 A1 | 3/2012 | Boll et al. |
| 2012/0084292 A1 | 4/2012 | Liang et al. |
| 2012/0086808 A1 | 4/2012 | Lynam et al. |
| 2012/0095649 A1 | 4/2012 | Klier et al. |
| 2012/0185131 A1 | 7/2012 | Headley |
| 2012/0191285 A1 | 7/2012 | Woolf et al. |
| 2012/0200706 A1 | 8/2012 | Greenwood et al. |
| 2012/0265416 A1 | 10/2012 | Lu et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0283909 A1 | 11/2012 | Dix |
| 2012/0283910 A1 | 11/2012 | Lee et al. |
| 2012/0288156 A1 | 11/2012 | Kido |
| 2012/0316732 A1 | 12/2012 | Auer |
| 2013/0006472 A1 | 1/2013 | McClain et al. |
| 2013/0024064 A1 | 1/2013 | Shepard |
| 2013/0027195 A1 | 1/2013 | Van Wiemeersch et al. |
| 2013/0038436 A1 | 2/2013 | Brey et al. |
| 2013/0041524 A1 | 2/2013 | Brey |
| 2013/0057397 A1 | 3/2013 | Cutler et al. |
| 2013/0076007 A1 | 3/2013 | Goode et al. |
| 2013/0148748 A1 | 6/2013 | Suda |
| 2013/0158803 A1 | 6/2013 | Headley |
| 2013/0158863 A1 | 6/2013 | Skvarce et al. |
| 2013/0226390 A1 | 8/2013 | Luo et al. |

(56) References Cited

U.S. PATENT DOCUMENTS

| | | |
|---|---|---|
| 2013/0253814 A1 | 9/2013 | Wirthlin |
| 2013/0268160 A1 | 10/2013 | Trombley et al. |
| 2014/0005918 A1 | 1/2014 | Qiang |
| 2014/0012465 A1 | 1/2014 | Shank et al. |
| 2014/0025260 A1 | 1/2014 | McClure |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0085472 A1 | 3/2014 | Lu et al. |
| 2014/0088797 A1 | 3/2014 | McClain et al. |
| 2014/0121930 A1 | 5/2014 | Allexi et al. |
| 2014/0156148 A1 | 6/2014 | Kikuchi |
| 2014/0160276 A1 | 6/2014 | Pliefke et al. |
| 2014/0172232 A1 | 6/2014 | Rupp et al. |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267868 A1 | 9/2014 | Mazzola et al. |
| 2014/0267869 A1 | 9/2014 | Sawa |
| 2014/0277941 A1 | 9/2014 | Chiu et al. |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie et al. |
| 2014/0343795 A1 | 11/2014 | Lavoie |
| 2014/0361955 A1 | 12/2014 | Goncalves |
| 2014/0379217 A1 | 12/2014 | Rupp et al. |
| 2015/0002670 A1 | 1/2015 | Bajpai |
| 2015/0057903 A1 | 2/2015 | Rhode et al. |
| 2015/0066296 A1 | 3/2015 | Trombley et al. |
| 2015/0115571 A1 | 4/2015 | Zhang et al. |
| 2015/0120141 A1 | 4/2015 | Lavoie et al. |
| 2015/0120143 A1 | 4/2015 | Schlichting |
| 2015/0134183 A1 | 5/2015 | Lavoie et al. |
| 2015/0138340 A1 | 5/2015 | Lavoie |
| 2015/0158527 A1 | 6/2015 | Hafner et al. |
| 2015/0165850 A1 | 6/2015 | Chiu et al. |
| 2015/0197278 A1 | 7/2015 | Boos et al. |
| 2015/0203156 A1 | 7/2015 | Hafner et al. |
| 2015/0210317 A1 | 7/2015 | Hafner et al. |
| 2015/0217693 A1 | 8/2015 | Pliefke et al. |

FOREIGN PATENT DOCUMENTS

| | | |
|---|---|---|
| CN | 202541524 U | 11/2012 |
| DE | 3931518 A1 | 4/1991 |
| DE | 9208595 U1 | 8/1992 |
| DE | 10065230 A1 | 7/2002 |
| DE | 10154612 A1 | 5/2003 |
| DE | 102005043467 A1 | 3/2007 |
| DE | 102005043468 A1 | 3/2007 |
| DE | 102006035021 | 1/2008 |
| DE | 102006048947 A1 | 4/2008 |
| DE | 102008020838 A1 | 11/2008 |
| DE | 102009012253 A1 | 9/2010 |
| DE | 102010004920 A1 | 7/2011 |
| DE | 102008004158 B4 | 10/2011 |
| DE | 102008004159 B4 | 10/2011 |
| DE | 102008004160 B4 | 10/2011 |
| DE | 102010021052 A1 | 11/2011 |
| DE | 102011108440 A1 | 1/2013 |
| EP | 0418653 A1 | 3/1991 |
| EP | 0849144 A2 | 6/1998 |
| EP | 1695888 A2 | 8/2006 |
| EP | 1593552 B1 | 3/2007 |
| EP | 2168815 A1 | 3/2010 |
| EP | 2199188 A2 | 6/2010 |
| EP | 2452549 A1 | 5/2012 |
| EP | 2551132 A1 | 1/2013 |
| EP | 2644477 A1 | 10/2013 |
| EP | 1569073 B1 | 9/2014 |
| EP | 2803944 A2 | 11/2014 |
| FR | 2515379 A1 | 10/1981 |
| FR | 2606717 A1 | 5/1988 |
| FR | 2716145 A1 | 8/1995 |
| FR | 2786456 A1 | 6/2000 |
| FR | 2980750 A1 | 4/2013 |
| GB | 2265587 A | 10/1993 |
| GB | 2342630 A | 4/2000 |
| GB | 2398048 A | 8/2004 |
| GB | 2398049 A | 8/2004 |
| GB | 2398050 A | 8/2004 |
| JP | 63-085568 | 6/1988 |
| JP | 06-028598 A | 4/1994 |
| JP | 2003148938 A | 5/2003 |
| JP | 2003175852 A | 6/2003 |
| JP | 2004114879 A | 4/2004 |
| JP | 3716722 B2 | 11/2005 |
| JP | 2008027138 A | 2/2008 |
| JP | 2008123028 A | 5/2008 |
| JP | 2009171122 A | 7/2009 |
| JP | 2012166647 A | 9/2012 |
| JP | 2014034289 A | 2/2014 |
| KR | 20060012710 A | 2/2006 |
| KR | 20060133750 A | 12/2006 |
| KR | 20110114897 A | 10/2011 |
| KR | 20140105199 A | 9/2014 |
| TW | 200930010 A | 7/2009 |
| WO | 8503263 A1 | 8/1985 |
| WO | 2011117372 A1 | 9/2011 |
| WO | 2014019730 A1 | 2/2014 |
| WO | 2014037500 A1 | 3/2014 |
| WO | 2014123575 A1 | 8/2014 |
| WO | 2015074027 A1 | 5/2015 |

OTHER PUBLICATIONS

Whitfield, Kermit, "A Hitchhiker's Guide to the Telematics Ecosystem", Automotive Design & Production, Oct. 1, 2003, 3 pgs.

Narasimhan, N.; Janssen, C.; Pearce, M.; Song, Y., "A Lightweight Remote Display Management Protocol for Mobile Devices", 2007, IEEE, pp. 711-715.

Microsoft, Navigation System, Sync Powered by Microsoft, Ford Motor Company, Jul. 2007, 164 pgs.

Microsoft, Supplemental Guide, Sync Powered by Microsoft, Ford Motor Company, Nov. 2007, 86 pgs.

Voelcker, J., "Top 10 Tech Cars: It's the Environment, Stupid", IEEE Spectrum, Apr. 2008, pp. 26-35.

Microsoft, Navigation System, Sync Powered by Microsoft, Ford Motor Company, Oct. 2008, 194 pgs.

Microsoft, Supplemental Guide, Sync Powered by Microsoft, Ford Motor Company, Oct. 2008, 83 pgs.

Chantry, Darryl, "Mapping Applications to the Cloud", Microsoft Corporation, Jan. 2009, 20 pgs.

Yarden, Raam; Surage Jr., Chris; Kim, Chong Il; Doboli, Alex; Voisan, Emil; Purcaru, Constantin, "TUKI: A Voice-Activated Information Browser", 2009, IEEE, pp. 1-5.

Gil-Castiñeira, Felipe; Chaves-Diéguez, David; González-Castaño, Francisco J., "Integration of Nomadic Devices with Automotive User Interfaces", IEEE Transactions on Consumer Electronics, Feb. 2009, vol. 55, Issue 1, pp. 34-41.

Microsoft, Navigation System, Sync Powered by Microsoft, Ford Motor Company, Jul. 2009, 196 pgs.

Microsoft, Supplemental Guide, Sync Powered by Microsoft, Ford Motor Company, Aug. 2009, 87 pgs.

Goodwin, Antuan, "Ford Unveils Open-Source Sync Developer Platform", The Car Tech Blog, Oct. 29, 2009, 5 pgs. [Retrieved from http://reviews.cnet.com/8301-13746_7-10385619-48.html on Feb. 15, 2011].

Lamberti, Ralf, "Full Circle: The Rise of Vehicle-Installed Telematics",Telematics Munich, Nov. 10, 2009, 12 pgs.

(56) References Cited

OTHER PUBLICATIONS

"Apple Files Patent Which Could Allow You to Control Your Computer Remotely Using iPhone", Dec. 18, 2009, 7 pgs [Retrieved from www.iphonehacks.com on Jun. 22, 2010].

Newmark, Zack, "Student develop in-car cloud computing apps; envision the future of in-car connectivity", May 4, 2010, 3 pgs [Retrieved from www.worldcarfans.com on Jun. 18, 2010].

"Service Discovery Protocol (SDP)", Palo Wireless Bluetooth Resource Center, 7 pgs [Retrieved from http://palowireless.com/infotooth/tutorial/sdp.asp on Aug. 3, 2010].

Sonnenberg, Jan, "Service and User Interface Transfer from Nomadic Devices to Car Infotainment Systems", Second International Conference on Automotive User Interfaces and Interactive Vehicular Applications (Automotive UI), Nov. 11-12, 2010, pp. 162-165.

"MobileSafer makes it easy to keep connected and safe", ZoomSafer Inc., 2010, 5 pgs. [Retrieved from http://zoomsafer.com/products/mobilesafer on Dec. 28, 2010].

"PhonEnforcer FAQs", Turnoffthecellphone.com, 3 pgs. [Retrieved from http://turnoffthecellphone.com/faq.html on Dec. 28, 2010].

"How PhonEnforcer Works", Turnoffthecellphone.com, 2 pgs. [Retrieved from http://turnoffthecellphone.com/howitworks.htm on Dec. 28, 2010].

European Patent Office, European Search Report for Application No. EP11151623, Feb. 15, 2011, 7 pgs.

Wikipedia, "X Window System", Wikipedia, The Free Encyclopedia, date unknown, 19 pgs. [Retrieved from http://en.wikipedia.org/w/index.php?title=X_Window_System&oldid=639253038].

"Ford Super Duty: Truck Technology", Brochure, www.media.ford.com, Sep. 2011, pp. 1-2.

"Ford Guide to Towing", Trailer Life, Magazine, 2012, pp. 1-38.

"Dodge Dart: The Hot Compact Car", Brochure, www.dart-mouth.com/enginerring-development.html, pp. 1-6; date unknown.

M. Wagner, D. Zoebel, and A. Meroth, "Adaptive Software and Systems Architecture for Driver Assistance Systems" International Journal of Machine Learning and Computing, Oct. 2011, vol. 1, No. 4, pp. 359-365.

Christian Lundquist, Wolfgang Reinelt, Olof Enqvist, "Back Driving Assistant for Passenger Cars with Trailer", SAE Int'l, ZF Lenksysteme Gmbh, Schwaebisch Gmuend, Germany, 2006, pp. 1-8.

"Understanding Tractor-Trailer Performance", Caterpillar, 2006, pp. 1-28.

Divelbiss, A.W.; Wen, J.T.; "Trajectory Tracking Control of a Car-Trailer System", IEEE, Control Systems Technology, Aug. 6, 2002, vol. 5, No. 3, ISSN: 1063-6536, pp. 269-278.

Stahn, R.; Heiserich, G.; Stopp, A., "Laser Scanner-Based Navigation for Commercial Vehicles", IEEE, Intelligent Vehicles Symposium, Jun. 2007, pp. 969-974, print ISBN: 1931-0587.

Widrow, B.; Lamego, M.M., "Neurointerfaces: Applications", IEEE, Adaptive Systems for Signal Processing, Communications, and Control Symposium, Oct. 2000, pp. 441-444.

Dieter Zoebel, David Polock, Philipp Wojke, "Steering Assistance for Backing Up Articulated Vehicles", Systemics, Cybernetics and Informatics, Universitaet Koblenz-Landau, Germany, vol. 1, No. 5, pp. 101-106; date unknown.

Stephen K. Young, Carol A. Eberhard, Philip J. Moffa, "Development of Performance Specifications for Collision Avoidance Systems for Lane Change, Merging and Backing", TRW Space and Electronics Group, Feb. 1995, pp. 1-31.

Ford Motor Company, "09 F-150", Brochure, www.fordvehicles.com, pp. 1-30; date unknown.

Michael Paine, "Heavy Vehicle Object Detection Systems", Vehicle Design and Research Pty Lmited for VicRoads, Jun. 2003, pp. 1-22.

Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, pp. 21-34.

"2012 Edge—Trailer Towing Selector", Brochure, Preliminary 2012 RV & Trailer Towing Guide Information, pp. 1-3.

"Meritor Wabco Reverse Detection Module for Trailers with 12-Volt Constant Power Systems", Technical Bulletin, TP-02172, Revised 10-04, pp. 1-8.

Simonoff, Adam J., "USH0001469 Remotely Piloted Vehicle Control and Interface System", Aug. 1, 1995, pp. 1-7.

"Range Rover Evoque's Surround Camera System"; MSN Douglas Newcomb Jun. 15, 2012, pp. 1-2.

"Electronic Trailer Steering", VSE, Advanced Steering & Suspension Solutions, Brochure, 2009, The Netherlands, pp. 1-28.

"WABCO Electronic Braking System—New Generation", Vehicle Control Systems—An American Standard Company, www.wabco-auto.com, 2004, pp. 1-8.

T. Wang, "Reverse-A-Matic-Wheel Direction Sensor System Operation and Installation Manual", Dec. 15, 2005, pp. 1-9.

"Wireless-Enabled Microphone, Speaker and User Interface for a Vehicle", The IP.com, Aug. 26, 2004, pp. 1-5, IP.com disclosure No. IPCOM000030782D.

"RFID Read/Write Module", Grand Idea Studio, 2013, pp. 1-3, website, http://www.grandideastudio.com/portfolio/rfid-read-write-module/.

Laszlo Palkovics, Pal Michelberger, Jozsef Bokor, Peter Gaspar, "Adaptive Identification for Heavy-Truck Stability Control", Vehicle Systems Dynamics Supplement, vol. 25, No. sup1, 1996, pp. 502-518.

"Convenience and Loadspace Features" Jaguar Land Rover Limited, 2012, pp. 1-15, http://www.landrover.com/us/en/lr/all-new-range-rover/explore/.

"Delphi Lane Departure Warning", Delphi Corporation, Troy, Michigan pp. 1-2; date unknown.

Micah Steele, R. Brent Gillespie, "Shared Control Between Human and Machine: Using a Haptic Steering Wheel to Aid in Land Vehicle Guidance", University of Michigan, pp. 1-5; date unknown.

"Electric Power Steering", Toyota Hybrid System Diagnosis-Course 072, Section 7, pp. 1-10; date unknown.

"Telematics Past, Present, and Future," Automotive Service Association, www.ASAshop.org, May 2008, 20 pgs.

"Fully Automatic Trailer Tow Hitch With LIN Bus," https://webista.bmw.com/webista/show?id=1860575499&lang=engb&print=1, pp. 1-5; date unknown.

* cited by examiner

HITCH ANGLE MONITORING SYSTEM AND METHOD

CROSS-REFERENCE TO RELATED APPLICATIONS

This patent application is a continuation-in-part of U.S. patent application Ser. No. 14/301,919 which was filed on Jun. 11, 2014, entitled "TRAILER LENGTH ESTIMATION IN HITCH ANGLE APPLICATIONS" which is a continuation-in-part of U.S. patent application Ser. No. 14/294,489, which was filed on Jun. 3, 2014, entitled "TRAILER LENGTH ESTIMATION IN HITCH ANGLE APPLICATIONS," which is a continuation-in-part of U.S. patent application Ser. No. 14/289,888, which was filed on May 29, 2014, entitled "DISPLAY SYSTEM UTILIZING VEHICLE AND TRAILER DYNAMICS," which is a continuation-in-part of U.S. patent application Ser. No. 14/256,427, which was filed on Apr. 18, 2014, entitled "CONTROL FOR TRAILER BACKUP ASSIST SYSTEM." U.S. patent application Ser. No. 14/294,489 is also a continuation-in-part of U.S. patent application Ser. No. 14/257,420 which was filed on Apr. 21, 2014, entitled "TRAJECTORY PLANNER FOR A TRAILER BACKUP ASSIST SYSTEM," which is a continuation-in-part of U.S. patent application Ser. No. 14/256,427, which was filed on Apr. 18, 2014, entitled "CONTROL FOR TRAILER BACKUP ASSIST SYSTEM," which is a continuation-in-part of U.S. patent application Ser. No. 14/249,781, which was filed on Apr. 10, 2014, entitled "SYSTEM AND METHOD FOR CALCULATING A HORIZONTAL CAMERA TO TARGET DISTANCE," which is a continuation-in-part of U.S. patent application Ser. No. 14/188,213, which was filed on Feb. 24, 2014, entitled "SENSOR SYSTEM AND METHOD FOR MONITORING TRAILER HITCH ANGLE," which is a continuation-in-part of U.S. patent application Ser. No. 13/847,508, which was filed on Mar. 20, 2013, entitled "HITCH ANGLE ESTIMATION." U.S. patent application Ser. No. 14/188,213 is also a continuation-in-part of U.S. patent application Ser. No. 14/068,387, which was filed on Oct. 31, 2013, entitled "TRAILER MONITORING SYSTEM AND METHOD," which is a continuation-in-part of U.S. patent application Ser. No. 14/059,835, which was filed on Oct. 22, 2013, entitled "TRAILER BACKUP ASSIST SYSTEM," which is a continuation-in-part of U.S. patent application Ser. No. 13/443,743 which was filed on Apr. 10, 2012, entitled "DETECTION OF AND COUNTERMEASURES FOR JACKKNIFE ENABLING CONDITIONS DURING TRAILER BACKUP ASSIST," which is a continuation-in-part of U.S. patent application Ser. No. 13/336,060, which was filed on Dec. 23, 2011, entitled "TRAILER PATH CURVATURE CONTROL FOR TRAILER BACKUP ASSIST," which claims benefit from U.S. Provisional Patent Application No. 61/477,132, which was filed on Apr. 19, 2011, entitled "TRAILER BACKUP ASSIST CURVATURE CONTROL." U.S. patent application Ser. No. 14/249,781 is also a continuation-in-part of U.S. patent application Ser. No. 14/161,832 which was filed Jan. 23, 2014, entitled "SUPPLEMENTAL VEHICLE LIGHTING SYSTEM FOR VISION BASED TARGET DETECTION," which is a continuation-in-part of U.S. patent application Ser. No. 14/059,835 which was filed on Oct. 22, 2013, entitled "TRAILER BACKUP ASSIST SYSTEM." Furthermore, U.S. patent application Ser. No. 14/249,781 is a continuation-in-part of U.S. application Ser. No. 14/201,130 which was filed on Mar. 7, 2014, entitled "SYSTEM AND METHOD OF CALIBRATING A TRAILER BACKUP ASSIST SYSTEM," which is a continuation-in-part of U.S. patent application Ser. No. 14/068,387, which was filed on Oct. 31, 2013, entitled "TRAILER MONITORING SYSTEM AND METHOD." The aforementioned related applications are hereby incorporated by reference in their entirety.

FIELD OF THE INVENTION

The disclosure made herein generally relates to driver assist technologies in vehicles, and more particularly to hitch angle monitoring that may be used in conjunction with a trailer backup assist system.

BACKGROUND OF THE INVENTION

Reversing a vehicle while towing a trailer is very challenging for many drivers. If a hitch angle between a tow vehicle and trailer becomes sufficiently large, a potential jackknife condition may result. Thus, there is a need for a hitch angle monitoring system that allows a driver to identify when a hitch angle between a tow vehicle and a trailer is approaching a suggested limit so as to avoid a potential jackknife condition.

SUMMARY OF THE INVENTION

According to one aspect of the present invention, a hitch angle monitoring system is provided. The system includes a display for showing an imaged scene of a hitch connection between a tow vehicle and a trailer. A processor is configured to superimpose an overlay on the imaged scene, wherein the overlay indicates a hitch angle position limit. A hitch angle position indicator is shown on the display and visually relates a hitch angle position to the hitch angle position limit.

According to another aspect of the present invention, a hitch angle monitoring system is provided. The system includes a display for showing an imaged scene. A processor is configured to superimpose an overlay on the imaged scene that indicates a hitch angle position limit between a tow vehicle and a trailer. A hitch angle position indicator is shown on the display and moves in relation to the hitch angle position limit based on a change in hitch angle between the tow vehicle and the trailer.

According to yet another aspect of the present invention, a hitch angle monitoring method is provided. The method includes the steps of imaging a rear vehicle scene, displaying the imaged scene, superimposing an overlay on the imaged scene that identifies a hitch angle position limit between a tow vehicle and a trailer, and displaying a hitch angle position indicator that identifies a current hitch angle position in relation to the hitch angle limit position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The disclosed subject matter is directed to a hitch angle monitoring system and method for use with a trailer backup assist (TBA) system. In particular, the system and method enables a driver of a tow vehicle to monitor a current hitch angle position in relation to a hitch angle position limit between a tow vehicle and an attached trailer. The system and method disclosed herein is particularly beneficial when implemented with a trailer backup assist system that utilizes a steering input apparatus to enable the driver of the tow vehicle to control the curvature for the path of travel of the attached trailer.

Figure 1:
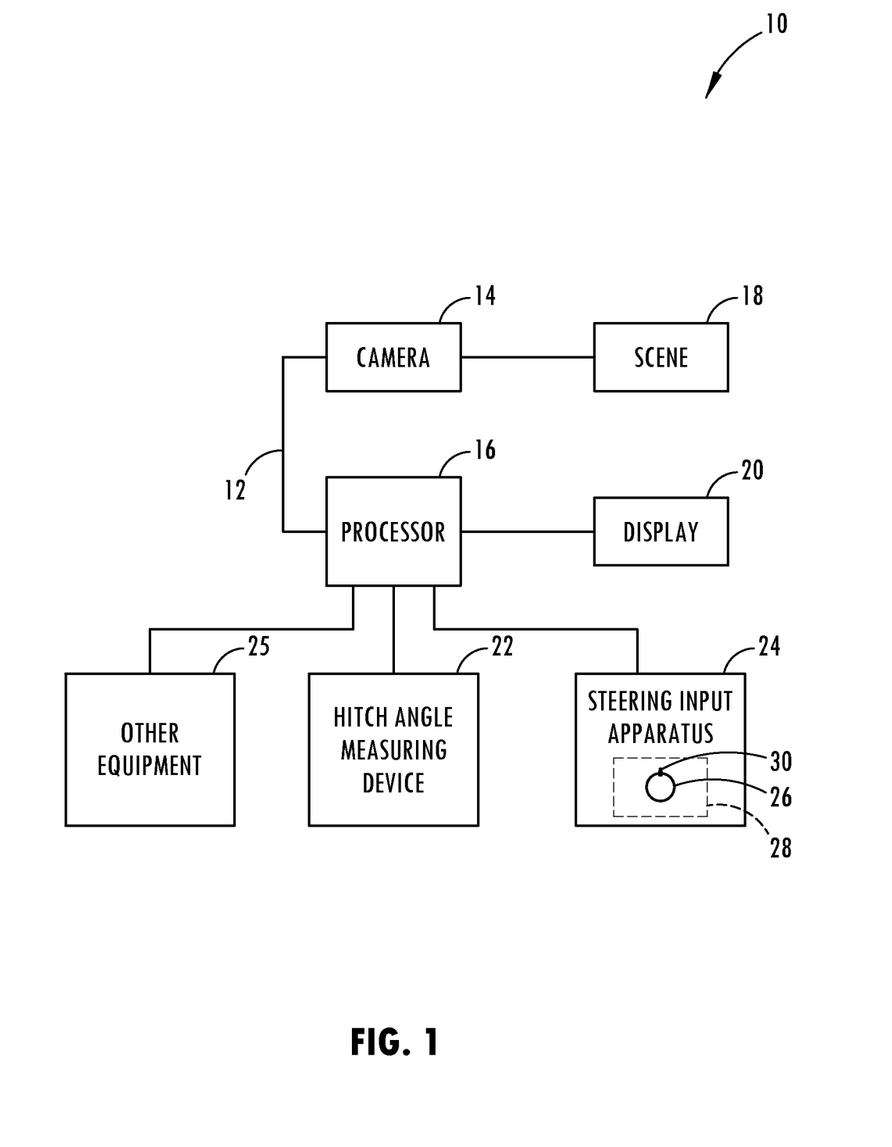
FIG. 1 shows a block diagram of a hitch angle monitoring system, according to one embodiment.

Referring to FIG. 1 a block diagram of a hitch angle monitoring system 10 is shown. The system 10 includes an imaging module 12 that includes a camera 14 in communication with a processor 16, both of which may be combined with a trailer backup assist system. The camera 14 can be provided on a tow vehicle in a rear-facing configuration and disposed to image a scene 18 of a hitch connection between the tow vehicle and a trailer. The processor 16 analyzes image data from the camera 14 and may output the imaged scene to a display 20, which may include an existing display of the trailer backup assist system or other display typically located within the tow vehicle and made visible to the driver. In one embodiment, the processor 16 may prompt the display 20 to automatically show the imaged scene when the tow vehicle has been placed in reverse or is otherwise in a parked position.

As is further shown in FIG. 1, the processor 16 may be in communication with a hitch angle measuring device 22, a steering input apparatus 24, and other equipment 25 related to the tow vehicle or independent thereof. In one embodiment, the processor 16 receives input from the hitch angle measuring device 22, which may include one or more hitch angle sensors configured to measure the hitch angle between the tow vehicle and trailer and send the hitch angle measurements to the processor 16. Additionally or alternatively, the hitch angle may be directly measured using the camera module 12. For example, the camera module 12 may employ object identification techniques in order to image a fixed target located on the trailer (e.g. trailer tongue) and the processor 16 may determine the hitch angle between the tow vehicle and trailer based on the target's location within the imaged scene.

The processor 16 may also receive input from the steering input apparatus 24, which may be a rotatable or a non-rotatable control input device. For purposes of illustration, the steering input apparatus 24 is shown embodied as a rotatable knob 26 that is angularly disposed in an at-rest position and is coupled to a movement sensing device 28. The movement sensing device 28 is configured for sensing movement of the knob 26 and outputting a corresponding signal (i.e., movement sensing device signal), which may be sent to the processor 16 and used by the trailer backup assist system to determine a proper wheel steer angle for the tow vehicle. The movement sensing device signal may be generated as a function of an amount of rotation of the knob 26 with respect to the at-rest position, a rate movement of the knob 26, and/or a direction of movement of the knob 26 with respect to the at-rest position.

The knob 26 may include a steering angle position indicator 30 having a fixed position on the knob 26 and serves as a visual aid identifying the rotational position of the knob 26 when turned relative to the at-rest position. In the illustrated embodiment, the at-rest position may correspond to the angular position of the knob 26 at which the steering angle position indicator 30 is located in the twelve o'clock position and indicates that the tow vehicle will back along a substantially straight path if the knob 26 is left alone. Assuming the tow vehicle and trailer are aligned with one another, the driver may turn the knob 26 either to the left or to the right during a backup maneuver, which causes the tow vehicle and trailer to be backed along a curved path in either a clockwise direction or a counterclockwise direction, respectively. As the knob 26 is turned further in either direction, the hitch angle between the tow vehicle and trailer increases, resulting in an increase in path curvature. Recognizing that trailers of differing dimensions (e.g. trailer length) respond at varying rates to positional changes of the knob 26, the processor 16 may generate one or more overlays, as described in greater detail below, that are shown on the display 20 to visually assist a driver with manipulating the knob 26 during a backup maneuver.

Figure 2:
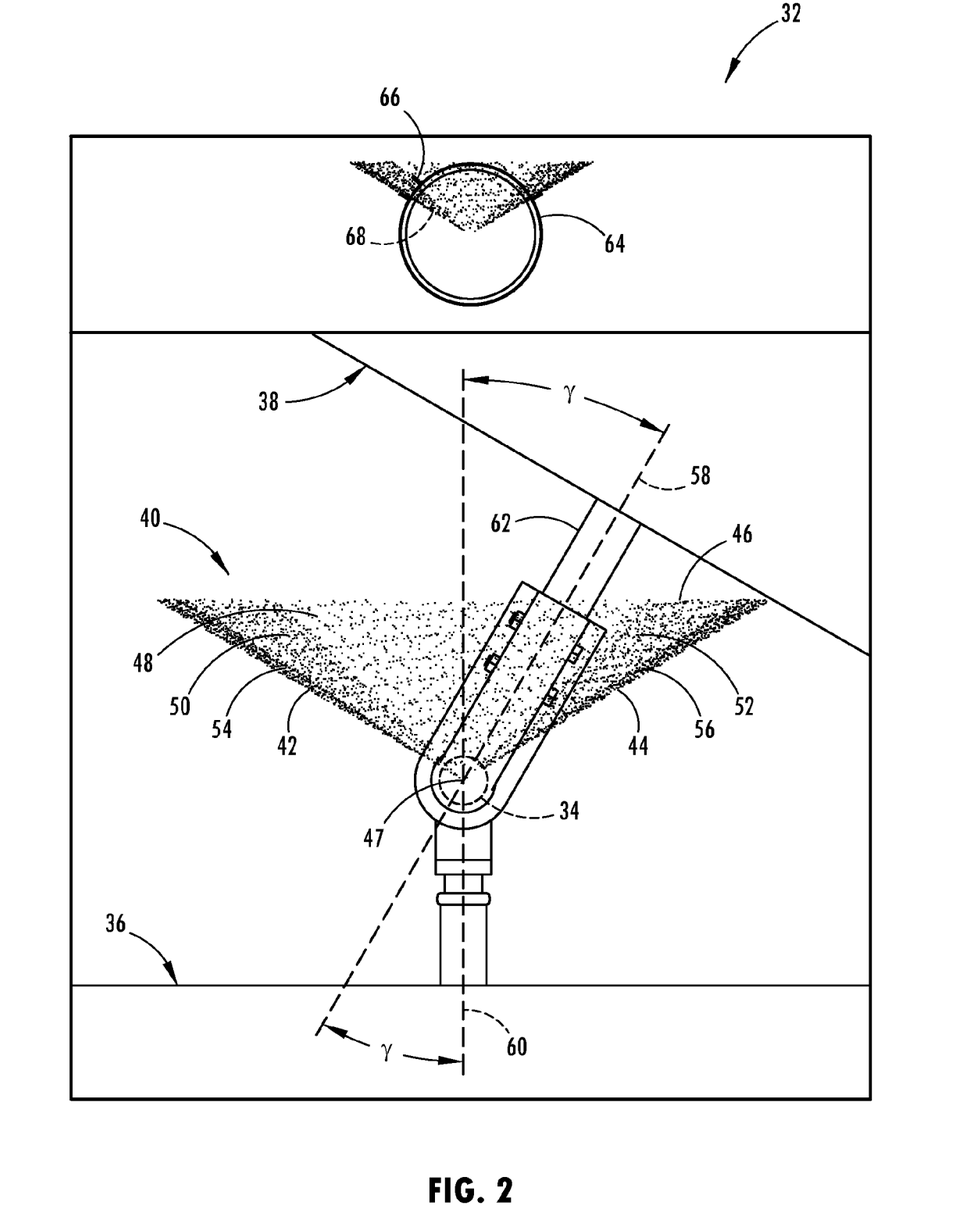
FIG. 2 is a diagram of an imaged scene showing a tow vehicle and a trailer being backed along a curved path in a clockwise direction.

FIG. 2 shows an imaged scene 32 of a trailer hitch connection 34 between a tow vehicle 36 and a trailer 38. An overlay 40 is superimposed on the imaged scene 32 and may be configured as an inverted triangle defined by a first boundary line 42, a second boundary line 44, and a third boundary line 46. As shown, the first and second boundary lines 42, 44 meet at point 47 coinciding with a central area of the imaged trailer hitch connection 34 and extend upward and outwardly therefrom in opposite directions before being joined to an end of the third boundary line 46, which extends horizontally across the imaged scene 32. With respect to the illustrated embodiment, the overlay 40 may be separated into a plurality of triangular regions that may include a central region 48, outer regions 50 and 52, and outermost regions 54 and 56. The position and dimensions of the overlay 40 may be determined by the processor 16 based on vehicle related information, camera related information, and/or trailer related information. While the overlay 40 and accompanying regions 48-56 have been shown and described herein as being triangular, it should be appreciated that other shapes may be used for accomplishing the same.

Figure 3:
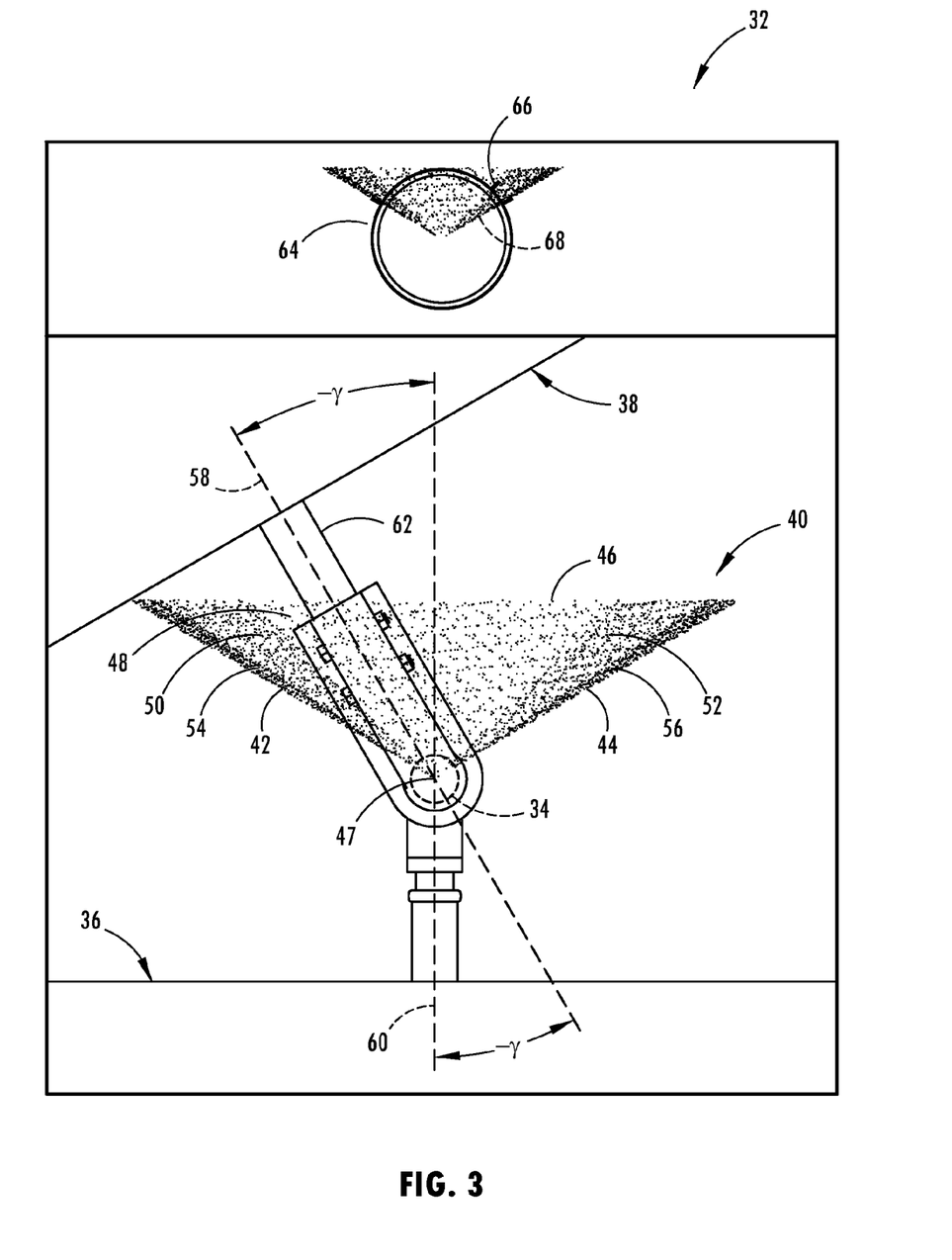
FIG. 3 is a diagram of an imaged scene showing a tow vehicle and a trailer being backed along a curved path in a counterclockwise direction.

According to one embodiment, each region 48-56 of the overlay 40 may encompass one or more hitch angle positions, each corresponding to an angular position of a centerline longitudinal axis 58 of the trailer 38 relative to a fixed centerline longitudinal axis 60 of the tow vehicle 36. Generally, the centerline longitudinal axis 60 of the tow vehicle 36 coincides with the centerline longitudinal axis 58 of the trailer 38 when the tow vehicle 36 is aligned with the trailer 38, which typically occurs prior to performing a backup maneuver. Subsequently, when a backup maneuver is performed, the hitch angle position tends to be static when the backup maneuver occurs along a straight path or dynamic when the backup maneuver occurs along a curved path. For instance, the imaged scene 32 shown in FIG. 2 may be captured while the tow vehicle 36 and trailer 38 are being backed along a curved path in a clockwise direction (i.e. the the tow vehicle 36 is steered to the left), which is manifested in the imaged scene 32 as a clockwise angular displacement of the centerline longitudinal axis 58 of the trailer 38 about point 47. Conversely, the backing of the tow vehicle 36 and trailer 38 along a curved path in a counterclockwise direction (i.e. the tow vehicle 36 is steered to the right) is manifested as a counterclockwise angular displacement of the centerline longitudinal axis 58 of the trailer 38 about point 47, as exemplarily shown in FIG. 3. In either case, a hitch angle γ describes the angular displacement of the centerline longitudinal axis 58 of the trailer 38 relative to the centerline longitudinal axis 60 of the tow vehicle 36 and generally increases positively with increasing path curvature in a clockwise direction (FIG. 2) or increases negatively with increasing path curvature in a counterclockwise direction (FIG. 3).

With respect to the illustrated embodiment, the central region 48 is symmetric about the centerline longitudinal axis 60 of the tow vehicle 36 and encompasses hitch angle positions having relatively small hitch angles γ in both the positive and negative directions. Outer regions 50 and 52 share mirror symmetry about the centerline longitudinal axis 60 of the tow vehicle 36 and encompass hitch angle positions having greater hitch angles in the positive and negative directions than those of the central region 48. Lastly, outermost regions 54 and 56 also share mirror symmetry about the centerline longitudinal axis 60 of the tow vehicle 36 and encompass hitch angle positions having the greatest hitch angles in both the positive and negative directions.

According to one embodiment, the outermost regions 54, 56 of the overlay 40 are each indicative of a suggested hitch angle position limit. The hitch angle position limit is not limited to any particular hitch angle value or set of values. In one implementation, the hitch angle position limit may correspond to an operational limit of a vehicle system such as, but not limited to, a trailer backup assist system. For instance, the hitch angle position limit may encompass a maximum hitch angle γ that may be achieved by the steering system of the tow vehicle 36. In another instance, the hitch angle position limit may encompass a maximum hitch angle γ at which a target disposed on the trailer 38 can be accurately detected by an imaging device. In yet another instance, the hitch angle position may encompass a maximum hitch angle γ before a potential jackknife condition is encountered. In any event, to provide greater visual impact, the overlay 40 may be generated as a color scale and each region 48-56 of the overlay 40 may be visually distinguished via a color associated therewith. According to one embodiment, the central region 48 may be distinguished using a green color, whereas outer regions 50, 52 may be distinguished using a yellow color and outermost regions 54 and 56 may be distinguished using a red color. However, it should be appreciated that the overlay 40 may be represented using only the outermost regions 54, 56.

To enable a driver of the towed vehicle 36 to monitor the hitch angle between the tow vehicle 36 and the trailer 38, the system 10 includes a hitch angle position indicator 62 that visually relates the current hitch angle position to the hitch angle position limit. For purposes of illustration, the hitch angle position indicator 62 is shown in FIGS. 2 and 3 as a trailer tongue but may include other visible imaged objects. When selecting the hitch angle position indicator 62, it may be advantageous to use imaged objects that both coincide with the centerline longitudinal axis 58 of the trailer 38 and move within the overlay 40 in a consistent manner therewith. Further, if using an overlay 40 generated as a color scale, the color scale should not be so bright as to prevent a driver from seeing the trailer tongue or other imaged object serving as the hitch angle position indicator 62.

With respect to the illustrated embodiments shown in FIGS. 2 and 3, the hitch angle position indicator 62 coincides with the centerline longitudinal axis 58 of the trailer 38. In this configuration, the hitch angle position indicator 62 is equidistant from each of the outermost regions 54, 56 when the centerline longitudinal axis 58 of the trailer 38 coincides with the centerline longitudinal axis 60 of the tow vehicle 36 and is angularly displaced either towards outermost region 54 or outermost region 56 when the hitch angle γ increases in either a negative direction or a positive direction, respectively. Thus, by tracking the position of the hitch angle position indicator 62 within the overlay 40, a driver of the tow vehicle 36 can quickly ascertain the current hitch angle position in relation to the hitch angle position limit.

Additionally or alternatively, the hitch angle position indicator 62 may be represented as a virtual object. According to one embodiment employing a color cast, the processor 16 may vary the brightness of the overlay 40 based on the current hitch angle position of the tow vehicle 36 and the trailer 38. For example, the current hitch angle position is shown in FIG. 2 as contained within the central region 48 of the overlay 40. In that instance, the central region 48 or portion thereof (e.g. the right half) may be made to glow brighter in color than the other regions 50-56. Alternatively, the brightness of the central region 48 or portion thereof may remain the same while the brightness of the other regions 50-56 is reduced or eliminated altogether. In either embodiment, the processor 16 can determine in which region 48-56 the current hitch angle position is located based on hitch angle measurements supplied thereto from the hitch angle measuring device 22, which may indicate both the hitch angle γ and heading relative to the centerline longitudinal axis 60 of the tow vehicle 36. By using hitch angle measurements to determine the current hitch angle position, the overlay 40 may be superimposed elsewhere on the imaged scene 32.

In the event that the current hitch angle position nears, reaches, and/or exceeds the hitch angle position limit, the processor 16 may generate a warning signal. The signal may be used to alert the driver of the tow vehicle 36 in a variety of forms. For instance, the signal may prompt a visual warning that includes flashing the outermost regions 54, 56 of the overlay 40. Additionally or alternatively, the signal may be sent to a vehicle audio system to prompt an auditory warning to the driver of the tow vehicle 36. Additionally or alternatively still, the signal may prompt a haptic warning, achievable in a variety of equipment such as, but not limited to, the steering input apparatus 24, a driver seat, and/or a smartphone or other portable electronic device.

Referring still to FIGS. 2 and 3, the processor 16 may be further configured to superimpose a virtual steering input apparatus 64 on the imaged scene 32 that mimics the physical characteristics and behavior of an actual steering input apparatus of a trailer backup assist system such as knob 26 shown in FIG. 1. According to one embodiment, the virtual steering input apparatus 64 is positioned on the imaged scene 32 above the overlay 40 and may include a virtual steering angle position indicator 66 that reflects the actual position of the knob 26. As shown in FIG. 2, the position of the virtual steering angle position indicator 66 indicates that the knob 26 has been turned counterclockwise from the at-rest position to steer the tow vehicle 36 to the left, thereby causing the tow vehicle 36 and trailer 38 to back along a curved path in a clockwise direction. As shown in FIG. 3, the position of the virtual steering angle position indicator 66 indicates that the knob 26 has been turned clockwise from the at-rest position, thereby causing the tow vehicle 36 and trailer 38 to back along a curved path in a counter clockwise direction. Additionally, the virtual steering input apparatus 64 may indicate a steering angle position limit 68 of the knob 26, which may be a suggested limit or correspond to one or more fixed end stops of the knob 26, if applicable. When the steering angle position limit 68 is neared, reached, or exceeded, the processor 16 may generate a signal used to elicit a visual, auditory, and/or haptic response. It should be appreciated that a color scale similar to the one described for the overlay 40 may be used for representing a plurality of steering angle positions if desired.

Figure 4:
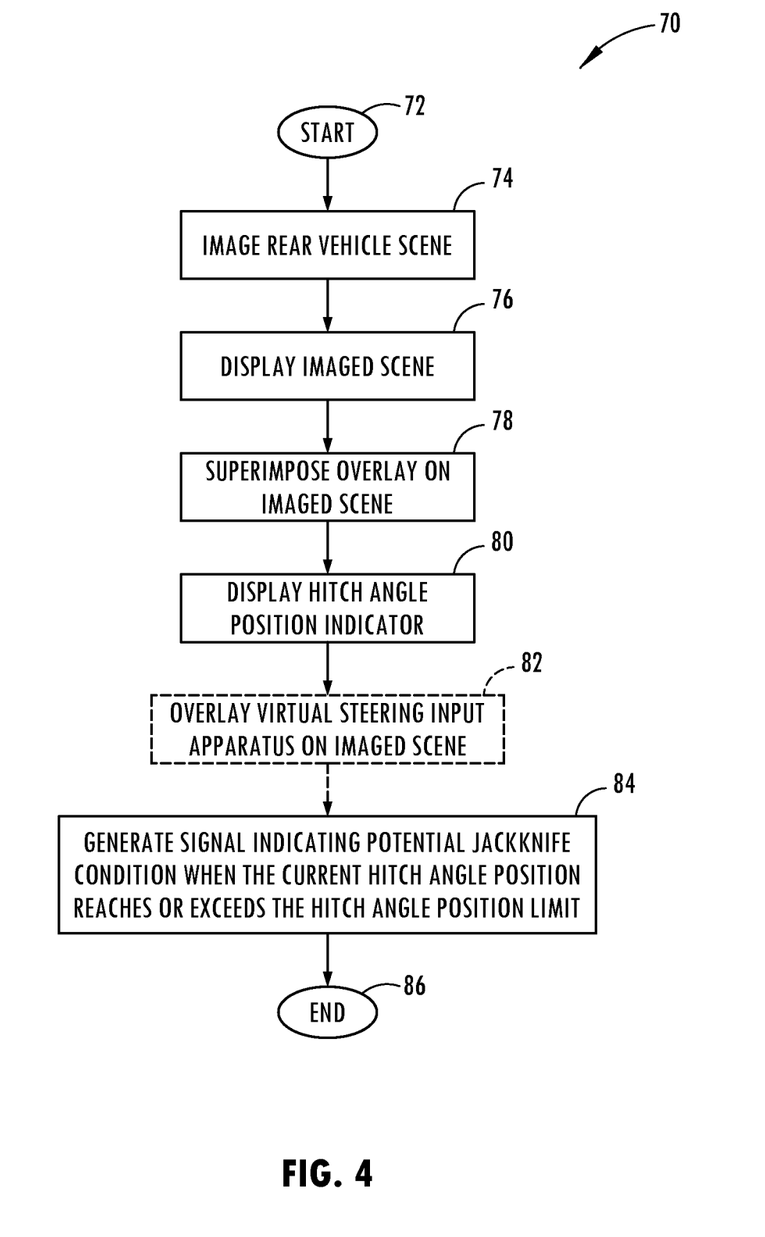
FIG. 4 is a flow chart of a hitch angle monitoring method, according to one embodiment.

Referring to FIG. 4, a flow diagram for a hitch angle monitoring method 70 is shown, according to one embodiment. The method 70 may be embodied as a routine stored in a memory of the imaging module 12 and is executed by the processor 16. The routine may start in step 72 when a tow vehicle 36 is placed in park or reverse. In step 74, the camera 14 images a rear vehicle scene. In step 76, the imaged scene 32 is displayed on a display 20 of a trailer backup assist system. In step 78, the processor 16 superimposes an overlay 40 on the imaged scene 32 that indicates a hitch angle position limit between the tow vehicle 36 and the trailer 38. In step 80, a hitch angle position indicator 62 is displayed on the display 20 and identifies a current hitch angle position in relation to the hitch angle limit position. In step 82, the processor 16 may optionally generate a virtual steering input apparatus 64 that is overlaid on the imaged scene 32 and mimics the physical characteristics and behavior of an actual steering input apparatus 24 of a trailer backup assist system. In step 84, the processor 16 generates a warning signal when the current hitch angle position reaches or exceeds the hitch angle position limit. Once the tow vehicle 36 is placed in drive or the ignition is turned OFF, the processor 16 may end the routine in step 86.

Accordingly, a hitch angle monitoring system 10 and method 70 have been advantageously described herein and enable a driver of a tow vehicle 36 attached to a trailer 38 to effectively monitor a current hitch angle position in relation to a hitch angle position limit.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A hitch angle monitoring system comprising:
    a display for showing an imaged scene of a hitch connection between a tow vehicle and a trailer;
    a processor configured to superimpose an overlay on the imaged scene, wherein the overlay indicates a hitch angle position limit; and
    a hitch angle position indicator that is shown on the display and visually relates a hitch angle position to the hitch angle position limit.

2. The hitch angle monitoring system of claim 1, wherein the hitch angle position corresponds to an angular position of a centerline longitudinal axis of the trailer relative to a centerline longitudinal axis of the tow vehicle.

3. The hitch angle monitoring system of claim 2, wherein the hitch angle position indicator is one of an imaged object visible in the imaged scene and a virtual object that is overlaid on the imaged scene.

4. The hitch angle monitoring system of claim 3, wherein the hitch angle position indicator coincides with the centerline longitudinal axis of the trailer and is positioned closer towards the hitch angle position limit when a hitch angle between the tow vehicle and the trailer increases.

5. The hitch angle monitoring system of claim 4, wherein the overlay includes a plurality of regions, each encompassing at least one hitch angle position and each visibly distinguished by an associated color.

6. The hitch angle monitoring system of claim 4, wherein the processor is further configured to generate a warning signal when the current hitch angle position nears, reaches, and/or exceeds the hitch angle position limit.

7. The hitch angle monitoring system of claim 1, wherein the processor is further configured to superimpose a virtual steering input apparatus on the imaged scene that mimics the physical characteristics and behavior of an actual steering input apparatus of a trailer backup assist system.

8. A hitch angle monitoring system comprising:
    a display for showing an imaged scene;
    a processor configured to superimpose an overlay on the imaged scene that indicates a hitch angle position limit between a tow vehicle and a trailer; and
    a hitch angle position indicator that is shown on the display and moves in relation to the hitch angle position limit based on a change in hitch angle between the tow vehicle and the trailer.

9. The hitch angle monitoring system of claim 8, wherein the hitch angle position corresponds to an angular position of a centerline longitudinal axis of the trailer relative to a centerline longitudinal axis of the tow vehicle.

10. The hitch angle monitoring system of claim 9, wherein the hitch angle position indicator moves within the overlay based on changes in a hitch angle between the tow vehicle and the trailer.

11. The system of 10, wherein the hitch angle position indicator moves by way of angular displacement and coincides in position with a centerline axis of the trailer while being displaced.

12. The hitch angle monitoring system of claim 11, wherein the overlay includes a plurality of regions, each encompassing at least one hitch angle position and each visibly distinguished by an associated color.

13. The hitch angle monitoring system of claim 11, wherein the overlay includes a plurality of regions, each encompassing at least one hitch angle position and each visibly distinguished by an associated color.

14. The system of claim 8, wherein the processor is further configured to generate a virtual steering input apparatus that is superimposed on the imaged scene and mimics the physical characteristics and behavior of an actual steering input apparatus of a trailer backup assist system.

15. A hitch angle monitoring method comprising the steps of:
    imaging a rear vehicle scene;
    displaying the imaged scene;
    superimposing an overlay on the imaged scene that identifies a hitch angle position limit between a tow vehicle and a trailer; and
    displaying a hitch angle position indicator that identifies a current hitch angle position in relation to the hitch angle limit position.

16. The hitch angle monitoring method of claim 15, wherein the hitch angle position corresponds to an angular position of a centerline longitudinal axis of the trailer relative to a centerline longitudinal axis of the tow vehicle.

17. The hitch angle monitoring method of claim 16, wherein the hitch angle position indicator coincides with the centerline longitudinal axis of the trailer and is positioned closer towards the hitch angle position limit when a hitch angle between the tow vehicle and the trailer increases.

18. The hitch angle monitoring method of claim 17, wherein the overlay includes a plurality of regions, each encompassing at least one hitch angle position and each visibly distinguished by an associated color.

19. The hitch angle monitoring method of claim 18, further comprising the step of generating a warning signal when the current hitch angle position nears, reaches, and/or exceeds the hitch angle position limit.

20. The hitch angle monitoring method of claim 19, further comprising the step of generating a virtual steering input apparatus that is overlaid on the imaged scene and mimics the physical characteristics and behavior of an actual steering input apparatus of a trailer backup assist system.

* * * * *